(12) United States Patent
Fehren et al.

(10) Patent No.: US 7,111,555 B2
(45) Date of Patent: Sep. 26, 2006

(54) METHOD AND DEVICE FOR REDUCING VIBRATIONS ON ROTATING PARTS, AND VIBRATION-DAMPED ROTATING PART

(75) Inventors: Heinrich Fehren, Kassel (DE); Erhard Herbert Glöckner, Eibelstadt (DE); Uwe Gnauert, Göttingen (DE); Holger Hanselka, Darmstadt (DE); Bernd Ulrich Herbert Keller, Höchberg (DE); Daniel Kohlrautz, Duderstadt (DE); Christof Linz, Magdeburg (DE); Hubertus Siebald, Rosdorf (DE); Grit Triebel, Magdeburg (DE); Axel Waldschmidt, Gleichen (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 87 days.

(21) Appl. No.: 10/521,589

(22) PCT Filed: Jul. 12, 2003

(86) PCT No.: PCT/DE03/02348

§ 371 (c)(1),
(2), (4) Date: Jan. 18, 2005

(87) PCT Pub. No.: WO2004/016431

PCT Pub. Date: Feb. 26, 2004

(65) Prior Publication Data

US 2005/0241433 A1   Nov. 3, 2005

(30) Foreign Application Priority Data

Jul. 19, 2002 (DE) .................. 102 33 086
Nov. 19, 2002 (DE) .................. 102 53 997

(51) Int. Cl.
*B41F 31/00* (2006.01)
*B41F 5/00* (2006.01)

(52) U.S. Cl. ...................... 101/483; 101/216

(58) Field of Classification Search ............ 101/483, 101/216, 217, 415.1, 375, 121–122, 142
See application file for complete search history.

(56) References Cited

U.S. PATENT DOCUMENTS

| 4,332,194 A | * | 6/1982 | Gensheimer ............... 101/216 |
| 4,341,157 A | * | 7/1982 | Simeth ...................... 101/375 |
| 4,738,200 A |   | 4/1988 | Stockl et al. |
| 4,875,636 A | * | 10/1989 | Kewin ..................... 242/613.5 |
| 5,429,048 A | * | 7/1995 | Gaffney et al. ............ 101/217 |
| 5,440,981 A | * | 8/1995 | Vrotacoe et al. |
| 5,596,931 A | * | 1/1997 | Rossler et al. ............ 101/484 |
| 5,601,020 A | * | 2/1997 | Dawley et al. ............ 101/217 |

(Continued)

FOREIGN PATENT DOCUMENTS

EP   0 194 618 A2   9/1986

(Continued)

*Primary Examiner*—Daniel J. Colilla
*Assistant Examiner*—Wasseem H. Hamdan
(74) *Attorney, Agent, or Firm*—Jones, Tullar & Cooper, P.C.

(57) ABSTRACT

A method and a device is used for reducing vibrations on at least two rotating elements, such as cooperating cylinders, which roll in opposite directions while situated in contact with each other. At least one of the elements has a surface protrusion that projects from an essentially circular contour of an active lateral surface. A height of this protrusion can be altered in a radial direction. A circumferential position of the protrusion can also be altered, all in accordance with a quality that characterizes a machine state or vibration.

38 Claims, 8 Drawing Sheets

U.S. PATENT DOCUMENTS

| | | | |
|---|---|---|---|
| 6,205,923 B1 * | 3/2001 | Dawley et al. | 101/382.1 |
| 6,505,555 B1 * | 1/2003 | Kanda | 101/217 |
| 6,526,888 B1 * | 3/2003 | Douillard et al. | 101/484 |
| 6,834,585 B1 * | 12/2004 | Hahn | 101/378 |
| 6,938,515 B1 * | 9/2005 | Glockner et al. | 464/180 |
| 7,040,225 B1 * | 5/2006 | Bolza-Schunemann | |
| 2003/0010150 A1 | 1/2003 | Glockner et al. | |

FOREIGN PATENT DOCUMENTS

| | | |
|---|---|---|
| WO | WO 01/50035 A1 | 12/2001 |

* cited by examiner

METHOD AND DEVICE FOR REDUCING VIBRATIONS ON ROTATING PARTS, AND VIBRATION-DAMPED ROTATING PART

CROSS-REFERENCE TO RELATED APPLICATIONS

This U.S. Patent Application is the U.S. National Phase, under 35 USC 371, of PCT/DE2003/002348, filed Jul. 12, 2003; published as WO 2004/016431 A1 on Feb. 26, 2004 and claiming priority to DE 102 33 086, filed Jul. 19, 2002 and to DE 102 53 997, filed Nov. 19, 2002, the disclosures of which are expressly incorporated herein by reference.

FIELD OF THE INVENTION

The present invention is directed to a method and to a device for reducing vibrations of rotating components, as well as to a vibration-damped rotating component. The rotating components roll off against each other. At least one raised area projects from a substantially circular contour of an effective surface area of at least one of the rotating components.

BACKGROUND OF THE INVENTION

EP 0 194 618 B1 discloses a device for reducing vibrations which are caused by rolling over a groove located on the surface area. A raise in height of the circular contour for affecting the force change behavior, is provided in this device in the entry or exit area of the groove.

A method for compensating for vibrations of rotating components is disclosed in WO 01/50035 A1. An actuator is arranged in the area of the surface of the rotating component, which actuator counteracts the vibration by the provision of a force component in the axial direction when the actuator is activated as a function of an angle of rotation position of the rotating component.

SUMMARY OF THE INVENTION

The object of the present invention is directed to providing a method and a device for reducing vibrations of rotating components, as well as to providing a vibration damped component.

In accordance with the present invention, this object is attained by the provision of at least one raised area projecting from a substantially circular contour of an effective surface area of at least one of two rotating components that roll off on each other. A height of the raised area, in the radial direction, and a position of the raised area, in the circumferential direction, can be changed as a function of a value that defines a printing press status or vibration.

The advantages to be gained by the present invention lie, in particular, in that a possibility for effectively and variably reducing vibrations has been provided. The reduction of the vibrations can take place actively, and possibly adaptively, during a production run and can be matched to the operating requirements.

The method and the device in accordance with the present invention can be employed with particular advantage in connection with at least one of two components rolling off on one another, such components being, for example, cylinders or rollers in which, viewed in the circumferential direction, at least one of the components has at least one interruption, such as, for example a groove, on its surface area.

Because of the ability to change, and in particular because of the ability to change, by remote control, the geometry and/or the position and/or the height of the raised area or areas on the cylinder surface area, the vibration can optimally be reduced through the various operational states, such as the speed of rotation, for example, on the one hand. On the other hand, the geometry and/or the position or the height per revolution, or during a part of the revolution, can be changed or can be modulated in order to do justice to the roll-over of the interruption at each nip point, for example in connection with the contact of the rotating body with several other cylinders and/or rollers.

In an advantageous embodiment of the present invention, an actuator, which can be remotely controlled, is configured as an actuator which can be charged with a pressure medium, such as, for example, as a hydraulic or as a pneumatic unit. In a variation, the actuator can be piezo-electrically configured.

BRIEF DESCRIPTION OF THE DRAWINGS

Preferred embodiments of the present invention are represented in the drawings and will be described in greater detail in what follows.

Shown are in:

FIG. 1, a schematic depiction of two rotating components working together, in FIG. 2, an enlarged representation of a nip point between the two rotating components depicted in FIG. 1, in FIG. 3, qualitative courses of an acceleration as a function of time, and showing at A: vibration without the formation of a raised area, and at B: with the formation of a raised area, in FIG. 4, a first preferred embodiment of a device for reducing vibrations in accordance with the present invention, in FIG. 5, a first preferred embodiment of the integration of a clamping or bracing device, in FIG. 6, a second preferred embodiment of the integration of a clamping or bracing device, in FIG. 7, a third preferred embodiment of the integration of a clamping or bracing device, in FIG. 8, a schematic representation of a method for controlling the device in accordance with the present invention, in FIG. 9, a qualitative representation of the interrelationship between a roll-off speed and a height of the raised area, or of the pressure, in FIG. 10, a schematic representation of a method for regulating the device, in FIG. 11, a qualitative representation of an interrelationship between a relative amplitude and the height of the raised area, or of the pressure, and in FIG. 12, a schematic representation of a method for regulating a device with four rotating components acting together respectively in pairs.

DESCRIPTION OF THE PREFERRED EMBODIMENT

Figure 1:
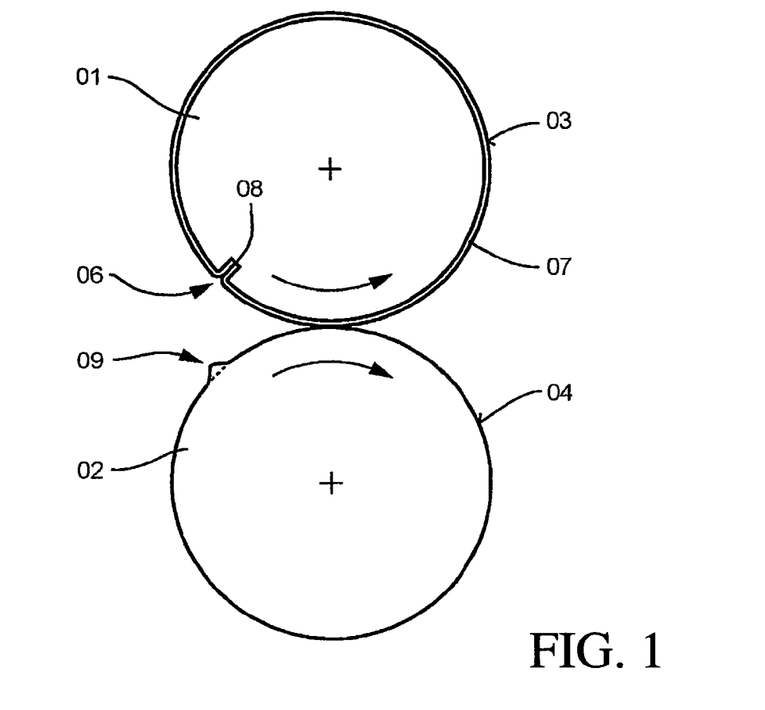
Figure 2:
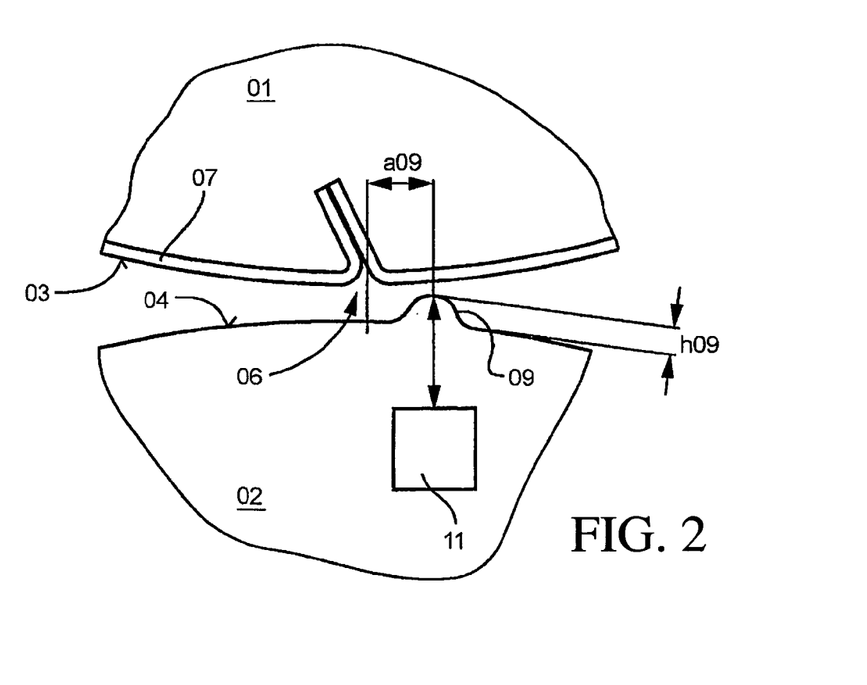

Referring initially to FIGS. 1 and 2 there is schematically depicted a rotating component 01, for example a cylinder 01, or a roller 01 of a machine, such as, for example, a treatment or a processing machine for webs and sheets, and in particular a cylinder or a roller of a rotary printing press. The cylinder 01 or roller 01 cooperates, in a contact position AN, with a second rotating component 02, for example a cylinder 02 or a roller 02. The two components 01, 02, called cylinders 01, 02 in the discussion which follows, roll off on or against each other in the area of their effective surface areas 03, 04 and have been placed against each other in a contact position AN, and with a force which, for example, can be predetermined or set, all as seen in FIG. 1. In an advantageous manner, the present invention can also be applied to rollers and cylinders of similar machinery for producing web-shaped material, such as, for example paper or sheet metal, and the like, in impression cylinders or in rolling mills.

Figure 4:
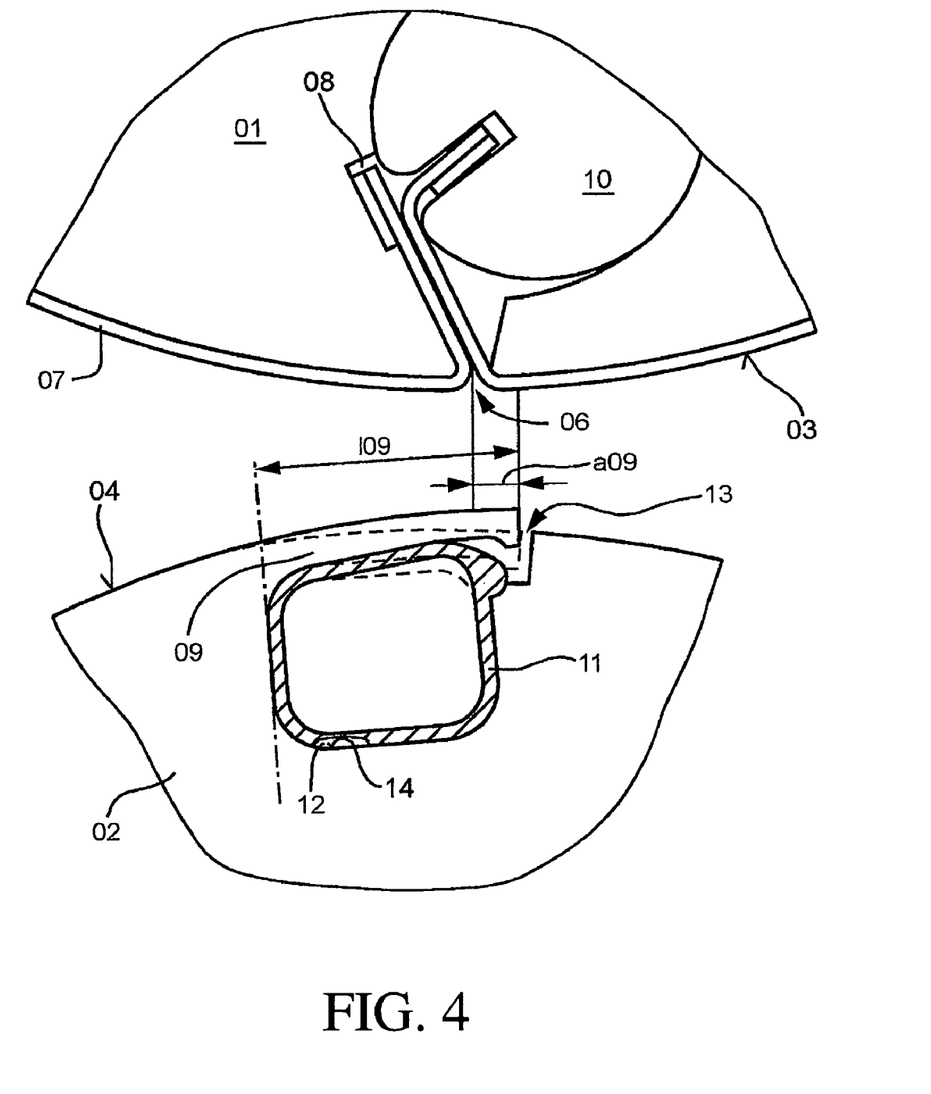

At least one of the cylinders 01, 02, such as, for example the first cylinder 01, configured as a transfer cylinder 01, has, in the area of its effective surface area 03, at least one axially extending interruption 06 of a circumferential surface contour which otherwise is circular in an unstressed state. The interruption 06 is, for example, based on a joint formed by ends of one or of several dressings 07 that are arranged on the cylinder 01. Alternatively, interruption 06 is caused because the ends of one or of several dressings 07 are arranged in a groove 08 that is extending in an area close to the surface of the cylinder 01. An opening from the surface area of the cylinder 01 to the groove 08 is kept as small as possible, and, in an advantageous embodiment, such a groove 08 is maximally 3 mm in circumferential width. The groove 08 can widen or open toward the cylinder interior and can have in it a device 10 for clamping and/or for bracing, as seen in FIG. 4. However, the interruption can also be designed solely as a slit 08.

In the contact position AN, as depicted schematically in FIG. 1, the two cylinders 01, 02 are placed against each other with a force which is greater than zero, and, in the course of the passage of the interruption 06 through the nip point, the two cylinders 01, 02 undergo a relief as well as a subsequent renewed stress. A vibration of the cylinder 01, 02, or of the cylinders 01, 02, is excited or caused by this cyclical stress and relief which vibration is, inter alia, a function of the cylinder contact forces, the geometry of the interruptions 06 and the cylinders 01, 02, the properties of the cylinder material, and the number of revolutions, or of a roll-off speed "v." Such a vibration is qualitatively represented in FIG. 3 as curve or line A, wherein the area within the dashed lines identifies the passage of the interruption 06 through the nip point. This vibration, which is excited by the passage of the interruption 06, has been damped and should not be confused, at this point, with other vibrations that are possibly induced in the individual cylinders 01, 02 by balance errors, or with a bending caused by gravity and/or the line force. The vibration depicted in FIG. 4 is excited during each revolution of the cylinder 01, 02 in the circumferential direction in response to alignment of the interruption 06 and the nip point.

To dampen the vibration, at least one of the cylinders 01, 02, for example the cylinder 02 which is configured as a forme cylinder 02, has at least one axially extending raised area 09 of a cylinder circumferential and axial surface contour, which otherwise is circular in the unstressed state, in the area of its effective surface area 04. This raised area 09 can extend axially continuously over a length of the effective barrel of cylinder 02, or can also extend in one or in several cylinder sections in the axial direction. As indicated in FIG. 2, the raised area 09 has a height h09, depicted as the maximum weight, in respect to the undisturbed contour or surface of cylinder 02, and an effective distance a09, again depicted as the maximum distance from the interruption 06 on the cooperating cylinder 01 in relation to a roll-off path at the rotating cylinders 01, 02.

Viewing the passage of the raised area 09, by itself, through the nip point, a vibration is also induced in the cylinders 01, 02 rolling off on each other. Depending on the relative position in respect to the passage over the interruption 06, i.e. depending on the rolled-off distance a09 or phase relation and the height h09, and/or the shape of the raised area 09, this counter-vibration causes an increase or decrease, and in the ideal case, effects a cancellation of the vibration amplitude caused by the passage of the interruption 06. Depending on its shape and its position, the raised area 09 provides a support effect between the cylinders 01, 02, which cylinders are radially moved with respect to each other by the excitation.

Figure 3:
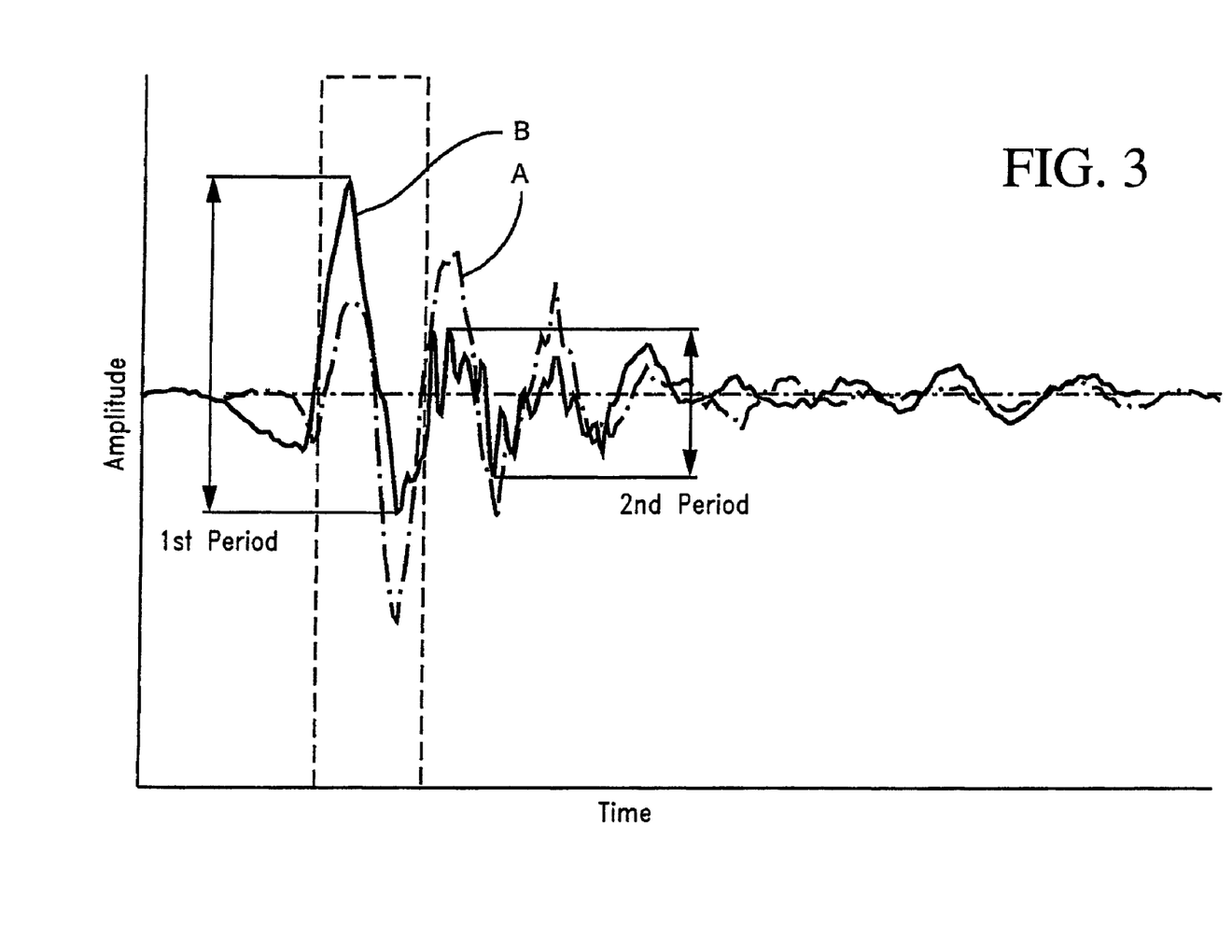

The height and the shape of the generated counter-vibration is partially a function of the shape of the raised area 09 and, in case of a raised area 09 having an asymmetrical shape with respect to the circumferential direction, is also partially a function of the direction of rotation of the cylinders 01, 02 rolling off on each other. A course of the resultant curve B of the vibration, caused by the superimposition of the vibration and counter-vibration is represented in FIG. 3, wherein the excitation was generated by the raised area 09 in the form of a ramp, as will be discussed below. An increase in an amplitude of the acceleration, which can initially be detected in the area of the passage of the interruption 06, which initially can be detected in the area of the passage of the interruption 06, is already followed by a clear decrease in the second period. Since the area of the interruption 06 is a non-printing area, the brief increase of the resultant vibration does not have a negative effect on the printed image, but the subsequent decrease has a positive effect.

The raised area 09 is now configured in such a way that its height a09 can be changed with respect to the undisturbed cylinder surface contour, in particular during operation of the cylinder pair 01, 02, i.e. during the roll-off of the cylinders 01, 02. To this end, the cylinder 02 has an actuating assembly 11 for use in changing the height h09, for example an actuating device 11, and in particular a remotely controllable actuator 11. In an advantageous embodiment of the present invention, the circumferential distance a09, as depicted in FIG. 4 is also configured to be changeable.

The provision of the raised area 09 can be technically realized in various ways. It is thus possible, for example, for fingers, which have been given a suitable shape, to be sunk, in a comb-like manner, into recesses in the surface area of the base body of the cylinders 01, 02, and for such fingers to be radially movable, by linear or by rotatory movements via an actuating assembly 11. A variation is also possible, in which an area of the surface 03, 04 of the respective cylinder 01, 02 has been structured to be elastically deformable or to be elastically resilient, within defined limits, and to be deflectable in the radial direction by an actuating assembly 11, such as, for example, cams or an eccentric shaft, or by other actuators, which may be arranged in the interior of the cylinder.

The actuator 11, or the actuators 11, can also be structured in different ways, for example as a function of the configuration[of the raised area 09. It can be configured as a part of a motor-driven, as a hydraulically or a pneumatically driven unit, or as a unit that operates based on magnetic or on piezo-electric forces.

In the following preferred embodiments, as depicted in FIGS. 4 to 12, the device and the method in accordance with the present invention are represented by the example of a raised area 09 structured as a tongue, alip or as a bracket 09, which can be substantially bent out of the contour of the surface area 03, 04 of the respective cylinder 01, 02 and which can reversibly spring back into alignment with the contour of the surface area 03, 04. The actuator 11 activating the tongue/lip/bracket 09 has been configured here as a part of a hydraulically operating unit.

In FIG. 4, the cylinder 02, here provided as a[the] forme cylinder 02, and working together with the transfer cylinder 01, has the tongue/lip/bracket 09, which can be raised. The tongue/lip/bracket 09, which is in the form of a one-armed lever, is embodied by a groove 12, which groove 12 is axially extending inside of the surface area 04 of cylinder 02, and an interruption or cut or opening 13 of the surface area connecting the groove 12 with its surroundings. Interruption 13 may be, for example, in the form of an axial cut 13. The tongue/lip/bracket 09 can be raised by the operation of a suitable hydraulic unit, which has an actuator 11 in the form of a reversibly deformable hollow body 11, which body 11 can be charged with a pressure medium. The actuator 11 is situated in the groove 12 extending axially in the cylinder 02. The hollow body 11 is arranged directly underneath the tongue/lip/bracket 09 in the interior of the cylinder 02, as is shown in FIG. 4, and is supported, toward the interior of cylinder 02, in the radial direction, at least partially on a cylindrical face 14 which is fixed in place on the cylinder.

Also represented in FIG. 4 is the effective distance a09 between the maximum raised area 09, configured here as the edge of the cut or opening 13 and the interruption 06 on cylinder 03, as well as an effective length l09 of the leg of the tongue/lip/bracket 09. The effective leg length l09 of the one-armed lever 09 represents the length of the tongue/lip/bracket 09, in the circumferential direction of cylinder 02 from the edge of the cut 13 to the point at which the tongue/lip/bracket 09 is "undermined" by the groove 12, as viewed in the radial direction. In an advantageous embodiment, the tongue/lip/bracket 09 extends over the entire axial length of a barrel of the cylinder 02. In FIG. 4, the tongue/lip/bracket 09 is represented in an active position, i.e. the actuator 11 is effective or is actuated. In another embodiment of the present invention, with several staggered cylinder grooves, or with several dressings, in which several interruptions 06 that are arranged side-by-side in the axial direction of the cylinder 01 are arranged offset in respect to each other in the circumferential direction, several of the raised areas 09 can be arranged staggered on cylinder 02 in the same way.

The actuator 11, which may be embodied as a hollow body 11, receives its fluid, or its other suitable operating pressure P, from the outside of cylinder 01, for example via a rotary throughput, which is not specifically represented, in the area of a journal, also not specifically represented, of the cylinder 02.

When they are placed against each other, the forme cylinder 02 acts together with the transfer cylinder 01, on whose surface a dressing 07, such as, for example, a rubber blanket 07, has been secured or braced. Ends 16, 17 of a single dressing 07, or of two dressings 07 that are arranged one behind the other in the circumferential direction of cylinder 01, are retained by the provision and the use of a clamping and/or a bracing device that is located in the groove 08. The interruption 06 in the effective surface area 03 of the cylinder 01 is formed in the area where the dressing end or ends 16, 17 leave the opening of the groove 08.

In an advantageous embodiment of the invention, the circumferential offset distance a09 is a length corresponding to a path of a sector of the cylinder 01, 02 of an opening angle of −1 to 8°, and in particular of 3° to 6°, on the surface area 03.

In an advantageous embodiment of the present invention, and with cylinders 01, 02 of an axial length l01, l02 of 1,350 to 1,550 mm, and with an effective circumference of 420 to 700 mm, and in particular of 500 to 600 mm, the tongue/lip/bracket 09 has an effective leg length l09 of 10 to 30 mm, and in particular has a length of 16 to 21 mm. The circumferential offset distance a09 is, for example, from 1.25 to 15 mm, and in particular is from 4 mm to 10 mm.

The ratio between the offset distance a09 and the length of the cylinder circumference lies between 0.002 and 0.02, and in particular lies between 0.005 and 0.015. The ratio between the leg length l09 and the length of the cylinder circumference lies between 0.02 and 0.04, and in particular lies between 0.03 and 0.035.

The raised area 09, configured as a tongue/lip/bracket 09 in accordance with FIG. 4, has been made asymmetric with respect to the direction of rotation of the cylinder 01, 02, or of the cylinders 01, 02. In one direction of cylinder rotation, the raised area 09 acts with a ramp shape and with a correspondingly shaped impulse, while in the other direction of cylinder rotation this raised area 09 acts as an impulse that is induced at a discontinuous skip location. Both forms will exhibit the above described vibration damping or counteracting effect wherein, however, the excitation resultant with travel of the cylinder 01 over the ramp in the direction of rotation, and with a discontinuous skip location, is of greater advantage.

The height h09 and/or the distance a09 can be set differently, depending on the direction of rotation, on the number of rotations and on the force of the contact, or the linear force between the cylinders 01, 02. For this purpose, it is possible to supply the direction of rotation as a value "g" defining the printing press status or the printing press to a control or regulating device explained further below.

A raised area 09, corresponding to, or similar to the arrangement represented in FIG. 4, by way of example by the forme cylinder 02, can be arranged on the transfer cylinder 01, either additionally to, or in place of the forme cylinder 02. Different variations for integrating a clamping device for the dressing 07, or for its ends 16, 17, are represented in subsequent FIGS. 5 to 7. These arrangements can be applied to dressings 07 which may be embodied as printing formes 07 on the forme cylinder 02, or which may be embodied as rubber blankets 07 on the transfer cylinder 01. In the case of rubber blankets 07, the use of metallic printing blankets 07 including an elastically deformable layer on a metal support is advantageous, since these blankets can be configured in the area of their ends, similar to those of printing formes 07 and can be clamped in the groove 08.

Figure 5:
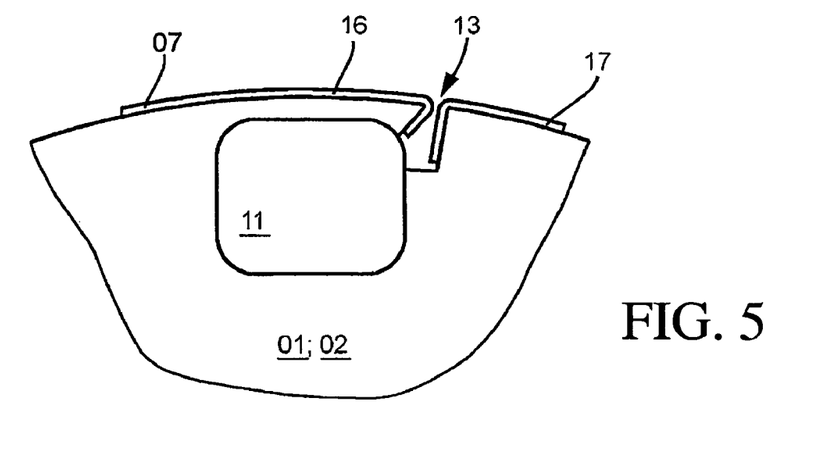

In FIG. 5, the cut, or opening or interruption 13 is embodied as an opening 13 in such a way that it has been made very narrow, less than or equal to 3 mm, wherein the ends 16, 17, for example the dressing ends 16, 17, are merely suspended.

Figure 6:
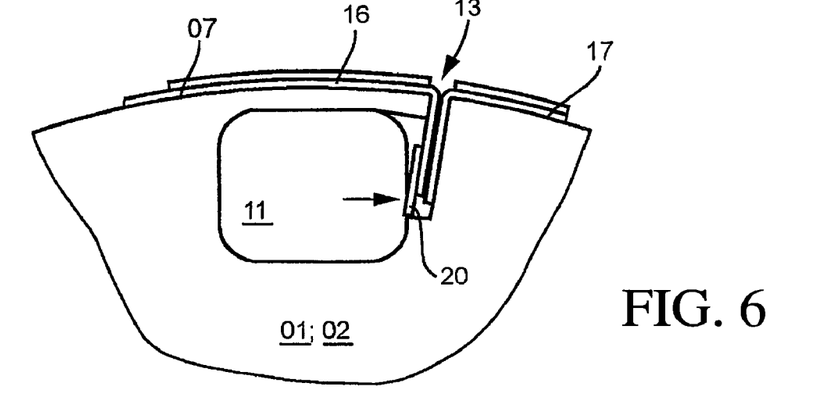

In FIG. 6, the cut or opening or interruption 13 is embodied as an opening 13 in such a way that the actuator 11 simultaneously acts on one or on two dressing ends 16, 17, either via a lever mechanism 20, which is only schematically indicated, or directly, and clamps the two dressing ends 16, 17.

Figure 7:
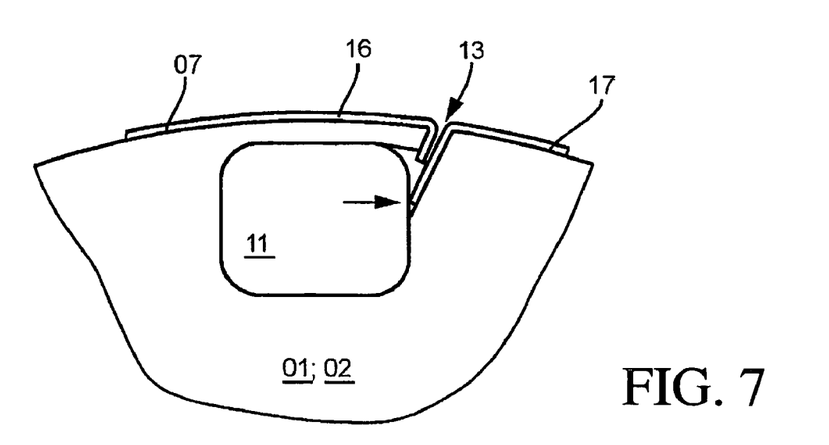

In FIG. 7, the cut or opening or interruption 13 is embodied as an opening 13 in such a way that, for example, the leading dressing end 16 is substantially held in place by the shape of the edge. The trailing dressing end 17 is clamped by the actuator 11.

As has been discussed in detail above, the height h09 of the raised area 09 is adapted to be changeable. Preferred embodiments of a method for controlling or regulating this height h09, and the device required to accomplish such a method, will be explained in what follows.

Figure 8:
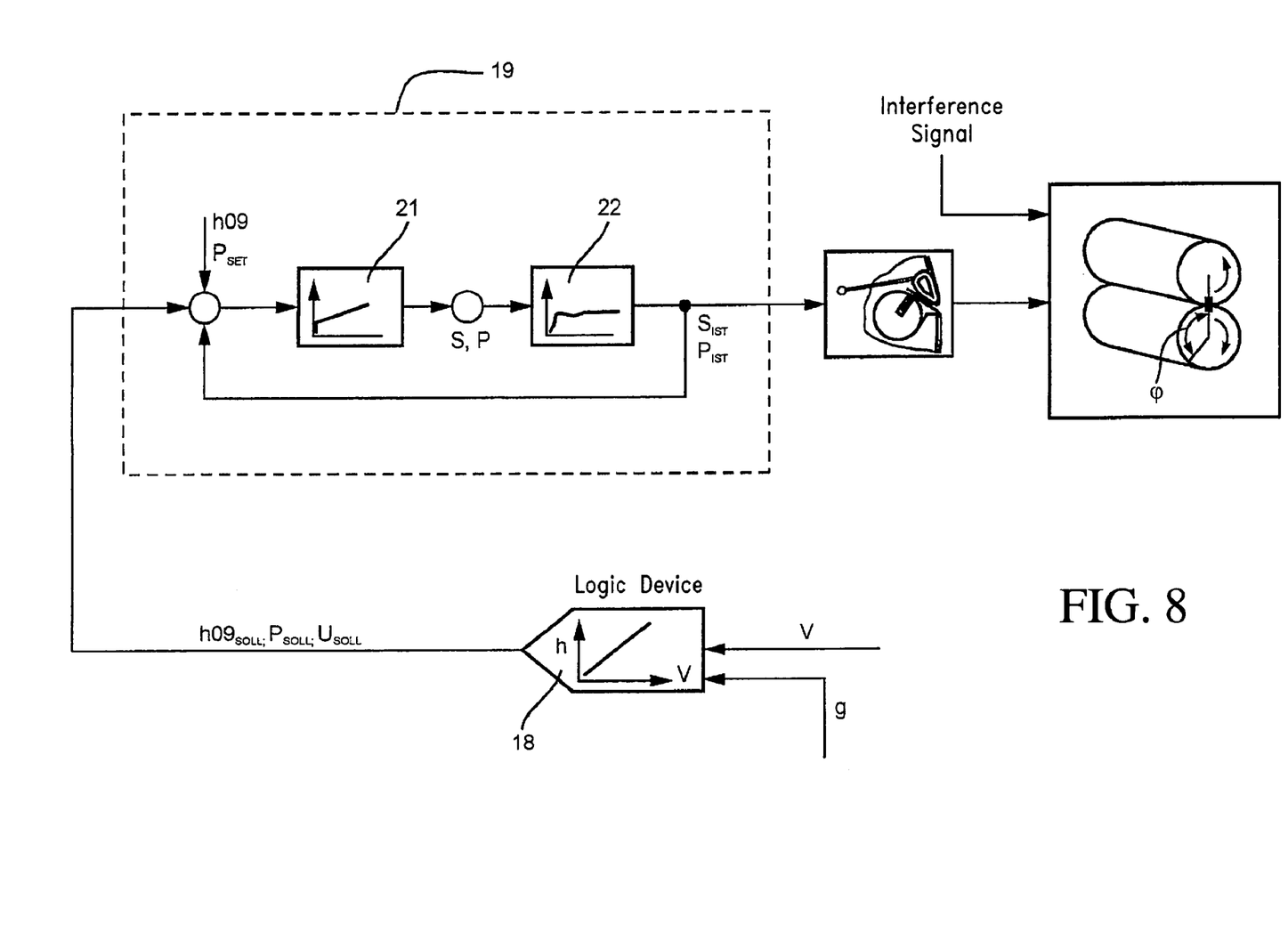

In a first preferred embodiment, as depicted schematically in FIG. 8, the regulation takes place by the utilization of a control system, which control system can contain a lower order regulating circuit.

A value "v" defining the printing press status, and in particular defining the roll-off speed "v," such as the number of revolutions or the angular speed, for example, is used as the command variable of the higher order control system. This value "v" can be obtained, for example, together with other values "g" defining the printing press status or the printing press, from a higher order printing press control device, or can also be measured in a suitable manner. Now, a reference variable of the manipulated variable is assigned to the value "v" in a logical unit 18 by the use of a stored interrelationship, such as, for example by the use of a table, arithmetically, or the like as the output value of the logical unit 18. The manipulated variable can directly be a desired height h09 of the raised area 09, a pressure P, a distance S, a voltage U, or the like. Accordingly, a reference variable $h09_{SOLL}$ for the height h09 of the raised area 09, a reference variable $P_{SOLL}$ for the pressure P of a hydraulic unit, a reference variable $S_{SOLL}$ for a travel or position signal S of an actuator 11, or a reference variable $U_{SOLL}$ for the voltage signal U of an actuator 11, are determined as the output values. This reference variable $h09_{SOLL}$, $P_{SOLL}$, $S_{SOLL}$, $U_{SOLL}$, is again used as a command variable for a lower order regulator device 19. A regulating device 21, for example a regulator 21, and in particular a controlled system 22 of the regulating device 21, can now be embodied in different ways, and can be matched to the type of the actuator 11 and to the input values.

Figure 9:
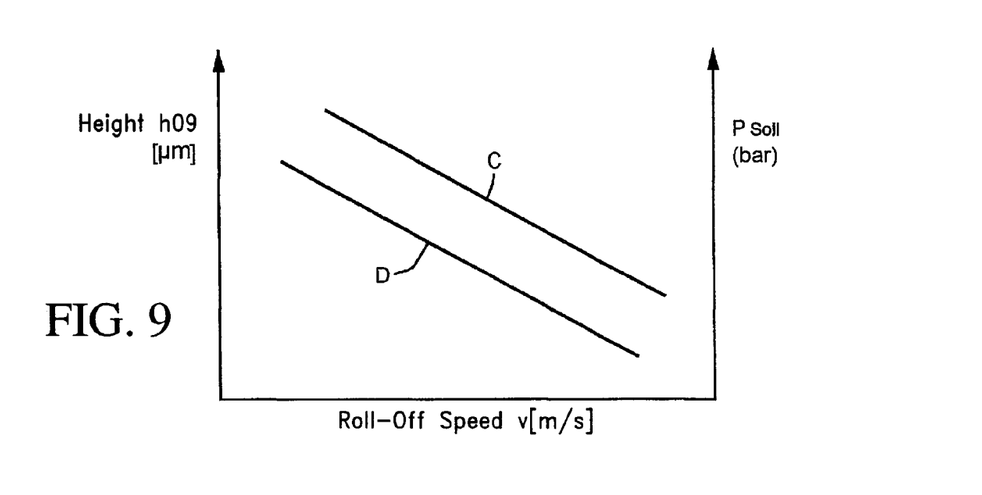

A functional, or an algebraic, and in particular a linear interrelationship between the roll-off speed "v" and the desired raised area 09 or of an appropriate travel, pressure or voltage signal has been stored in the logical unit 18 as the logic. This interrelationship, which is particularly linearized, between the roll-off speed "v" and the reference variable $h09_{SOLL}$, $P_{SOLL}$, $S_{SOLL}$, $U_{SOLL}$ for the height h09 of the raised area 09, or the pressure P, the travel S or the voltage U can be present many times for different cylinder geometries and/or for values "g" defining the printing press status or the printing press, and can be appropriately selected, as depicted in FIG. 9, as interrelationships C, D.

Such an interrelationship can also be advantageously used for starting and for running up the printing press to its operational speed, so that a suitable height for the raised area 09 is provided in connection with each roll-off speed "v."

In a further development, the regulating device permits an optimization of the actual production conditions or circumstances because of its adaptive structure.

In case of the provision of a hydraulic unit, in accordance with the preferred embodiments in FIGS. 4 to 7, a linearized interrelationship between the roll-off speed "v" and the reference value $P_{SOLL}$ for the pressure P is stored as the logic, for example. A known interrelationship between the pressure P in the hollow body 11 and the resulting height h09 of the raised area 09 can be the basis for this logic. Now, the actuator 11, which is embodied as a hollow body 11, is charged with the appropriate pressure P, which is maintained, if required, by the use of the regulator device 19, via the controlled system 22 which may be embodied as a valve 22, wherein an actual value $P_{IST}$ is returned to the lower order regulating circuit. This accordingly applies to the manipulated values S, U, h09, which differ from the pressure P. Thus, the tongue/lip/bracket 09 is raised by the corresponding height h09 as a function of the roll-off speed "v" and in accordance with the existing pressure $P_{IST}$ and is maintained there. If the roll-off speed "v," or if another production condition, changes, the pressure P, or one of the other manipulated values is again determined and is again set. No continuous checking of the roll-off speed "v" need be performed. Instead, this can take place at discrete intervals, for example following a fixed number of cylinder revolutions. In a further development, a starting value $P_{IST}$ can also be supplied to the lower order regulating circuit, which can be predetermined from a printing press control, or also manually, for example during the start-up phase or under extremely non-stationary conditions.

Figure 10:
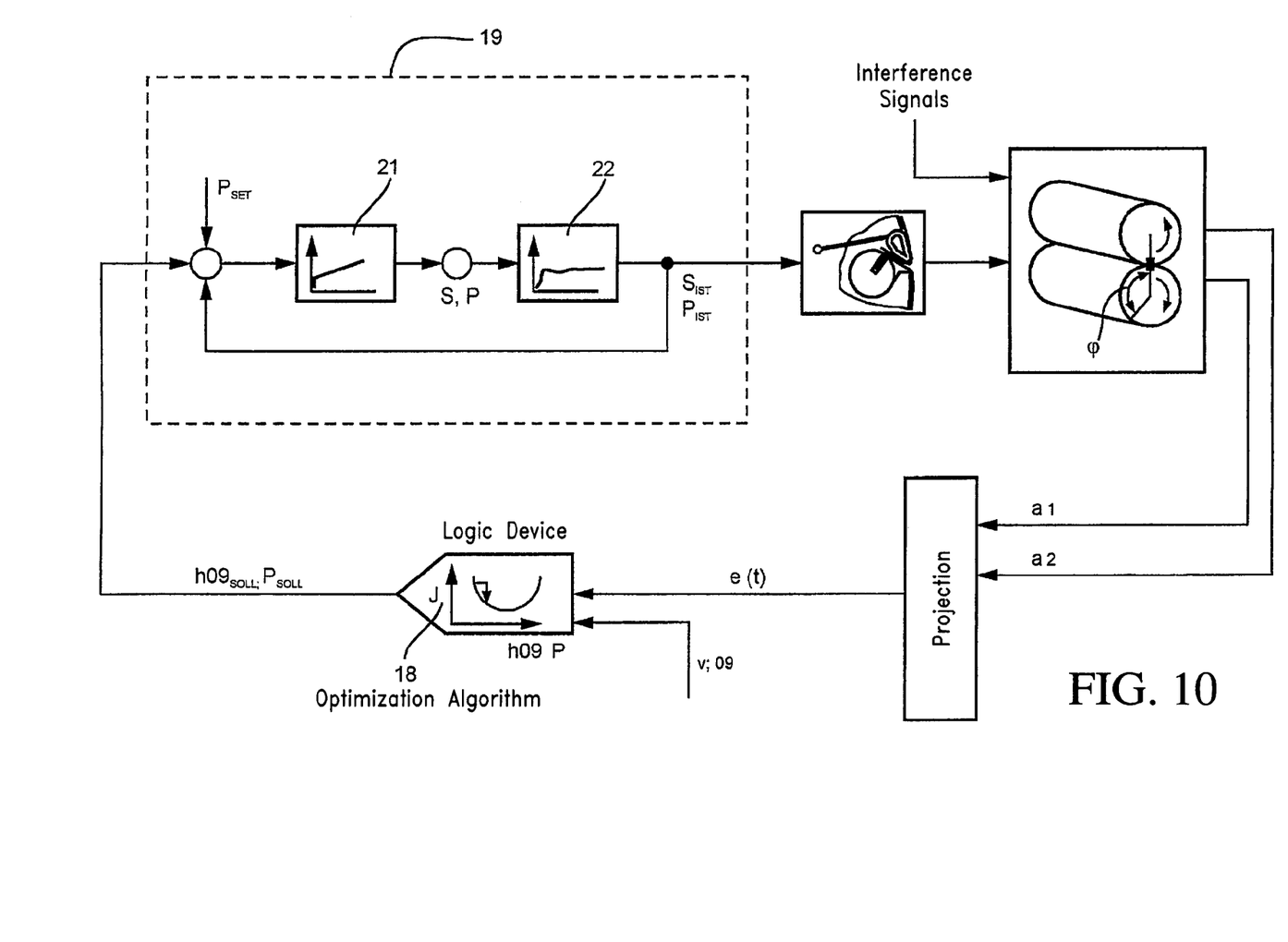

In a further preferred embodiment of the present invention, as shown in FIG. 10, the reduction takes place by the use of a higher order regulating device, which can again contain the previously described regulating circuit of the lower order regulator device 19.

In contrast to FIG. 8, in the embodiment depicted in FIG. 10, a value e(t), which defines the cylinder on the press vibration, is fed, as the input value, to the logical unit 18. In particular, the value e(t) contains a relative value between amplitudes a1, a2, which are measured at both cylinders 01, 02 and which are projected on a plane through the axes of rotation of the two cylinders 01, 02. Therefore, in what follows, the value e(t) will also be called a relative amplitude e(t). If the two cylinders 01, 02 vibrate equiphased in this plane, at the same amplitude e(t), a resultant value of zero would result. In addition, as described in connection with FIG. 8, the roll-off speed "v" and/or other values "g" defining the printing press status or the printing press, can also be supplied as input values. In a further difference from FIG. 8, in the embodiment depicted in FIG. 10, the logical unit 18 has an optimization algorithm which varies the output values $h09_{SOLL}$, $P_{SOLL}$ on the basis of the values e(t) in such a way that e(t) is minimized.

Figure 11:
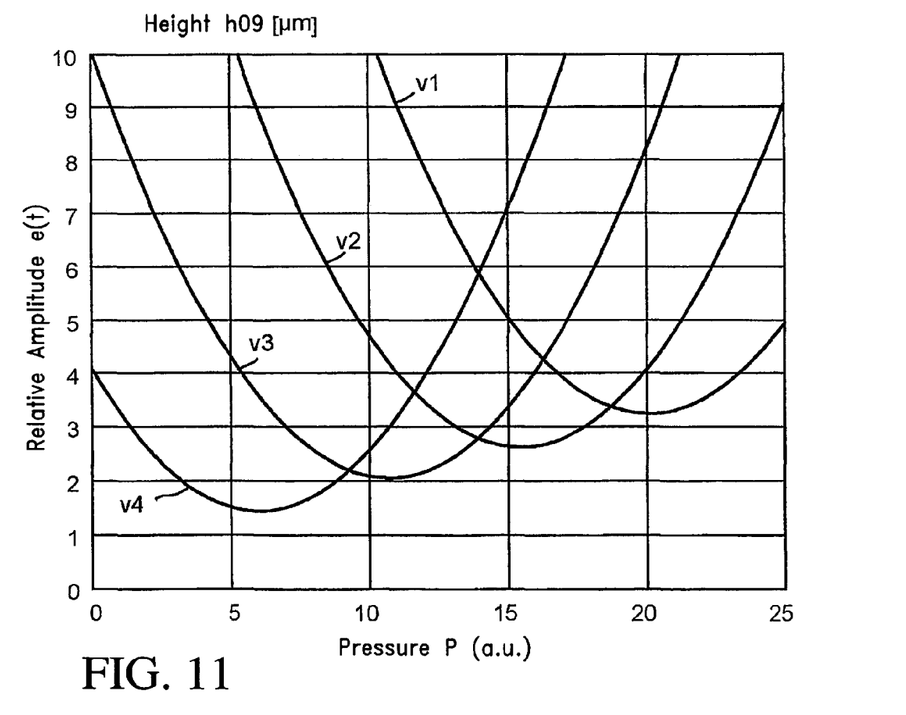

In an advantageous embodiment of the present invention, the variation takes place in accordance with interrelationships which are stored in the logical unit 18, for example the dependence of the relative amplitude e(t) on the height h09 or on the pressure P, as shown in FIG. 11, or on the distance a09. It is possible to preset a group of curves or an arithmetic connection for different ranges of the roll-off speed "v," for example the number of revolutions. With the roll-off speed "v" or the number of revolutions known, a variation now takes place along the interrelationship preset for this roll-off speed "v" or this number of revolutions. For example, in FIG. 11 a curve identified by v1 denotes a number of revolutions of 20,000 rph, v2 of 40,000 rph, v3 of 60,000 rph and v4 of 80,000 rph. Here, too, a measurement of the vibrations and a variation possibly resulting therefrom need not take place continuously, but can be determined regularly within finite time intervals, or in accordance with a defined number of cylinder revolutions.

Further processing of the reference variable $h09_{SOLL}$, $P_{SOLL}$ generated in the logical unit in the described manner takes place in accordance with the process explained in connection with FIG. 8.

Figure 12:
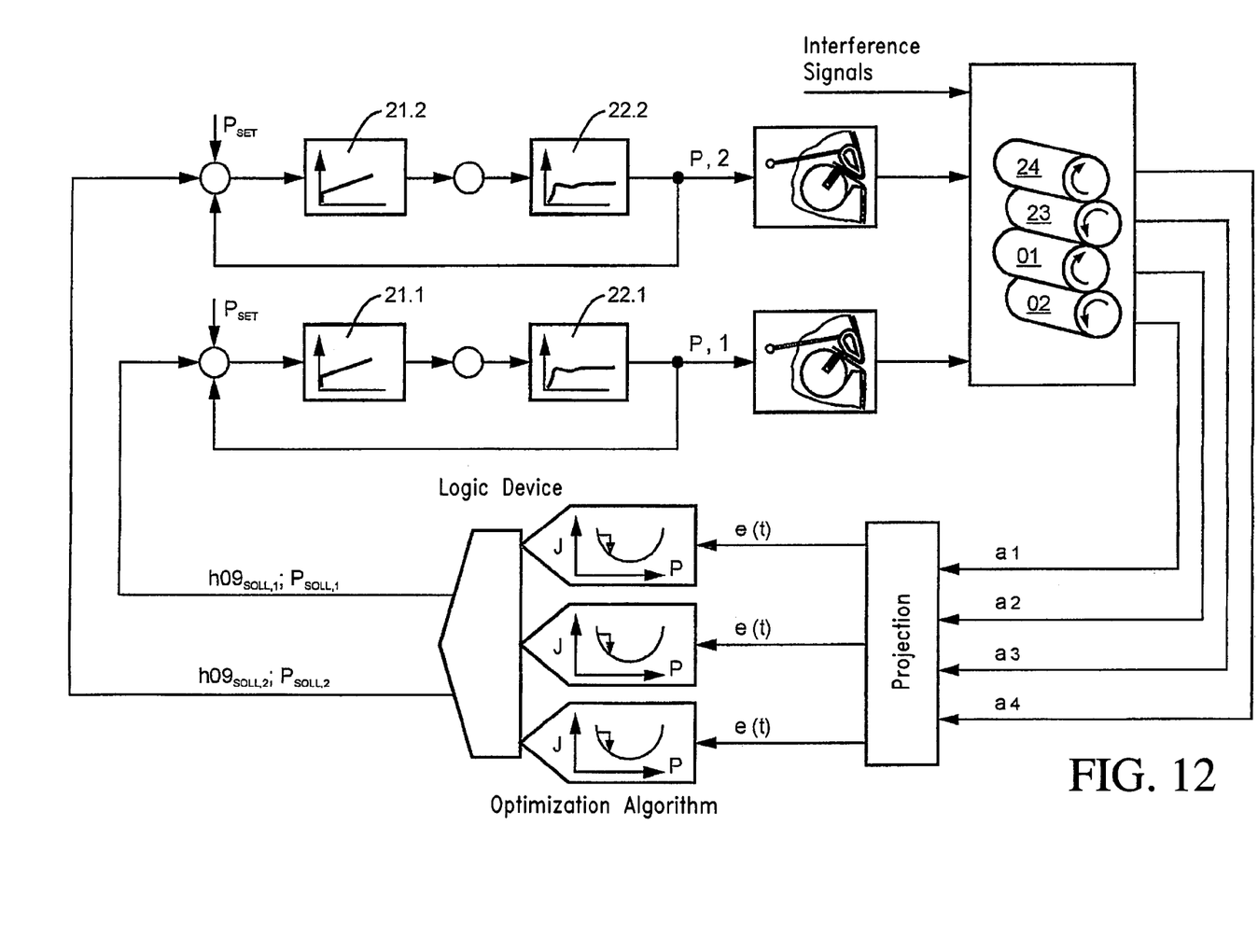

FIG. 12 shows a multi-roller system, and in particular a four-roller system, wherein the previously described transfer cylinder 01 works or cooperates together with its forme cylinder 02, and also works, in the contact position AN, with a further component 23, for example with a cylinder 23 configured as a counter-pressure cylinder 23, which, in this case, may be a second transfer cylinder 23. A component 24, for example a cylinder 24, for example a second forme cylinder 24, is assigned to the second transfer cylinder 23 and works together with the latter in the contact position AN. Only two of the four cylinders 01, 02, 23, 24, and in particular only the two transfer cylinders 01, 23, each have an actuator 11 and a raised area 09, whose height h09 and/or whose phase relation or distance a09 can be changed. The principal functioning can also be applied to other multi-roller systems, such as to satellite units with 3, 9 or 10 cooperating cylinder, for example.

Analogously to the preferred embodiment discussed in accordance with FIG. 10, four amplitudes, or four vibration courses a1, a2, a3, a4, and corresponding to the number of cylinders of the cylinders 01, 02, 23, 24 involved are determined, and from these amplitudes, a number of relative amplitudes $e1(t)$, $e2(1)$, $e3(1)$, corresponding to the number of nip points, is formed, which relative amplitudes are supplied, as input values, to the logical unit 18. Now, the optimization algorithm has an interrelationship for each nip point, for the respective passage of the raised area 09, or the interruption 06, through the nip point. If one of the inner cylinders 01, 23, for example if the transfer cylinder 01 is considered, the passage to the forme cylinder 02 at the nip point takes place at a defined time, and the passage to the second transfer cylinder 23 takes place at another defined time. Therefore, the demands made on the optimal height h09, or on the desired pressure $P_{SOLL}$, can be different for both passages. It is now possible to resolve this problem advantageously in two different ways.

In a first preferred embodiment, a height $h09_{SOLL.1}$, or a pressure $P_{SOLL.1}$ is determined in the logical unit 18 in such a way that a compromise is found, while observing the two dependencies, taking into consideration the relative amplitudes $e1(t)$, $e2(t)$, which minimizes the two relative amplitudes $e1(t)$, $e2(1)$ as a whole. The same applies to the two other cylinders 23, 24, taking into consideration the relative amplitudes $e3(t)$, $e4(t)$ for the height $h09_{SOLL.2}$, or the pressure $P_{SOLL.2}$. Then the respective actuator 11.1 or 11.2 is charged with the height h09, or with the respective pressure P1, P2, which is or which will be regulated to $P_{SOLL.1}$ or to $P_{SOLL.2}$, corresponding to this compromise for the existing roll-off speed "v," via the associated regulating device 21.1, 21.2, and the controlled system 22.1, 22.2 which may be embodied as valves.

In a second preferred embodiment, a phase-dependent variation of the optimization takes place for the height h09, or for the pressure $P_{SOLL}$. It is now possible to change the height h09 of the raised area 09 at least twice for each revolution of the cylinder 01, 23 using the actuator 11, and in this case the raised area 09 assumes different values at the times of its passage through the one or the other respective nip points. Then the height h09 is changed for each revolution as a function of the angular position of the cylinder 01, 23 having the actuator 11. If more than one interruption 06 and/or more than one raised area 09 is arranged in the circumferential direction of the cylinder(s) 01, 02, 23, 24, the number of the possibly required changes, or the number of the values of the height h09, possibly changes accordingly.

In the case of the four cylinders 01, 02, 23, 24, two pressures $P_{SOLL.1}$, $P_{SOLL.2}$ are issued by the logical unit 18 as the reference variables $P_{SOLL.1}$, $P_{SOLL.2}$, each of which is fed into a lower order regulator device 19 of respective actuators 11 for a changeable raised area 09. Here, the two raised areas 09 are arranged on the two transfer cylinders 01, 23.

It is also possible to arrange more than one raised area 09, for example to arrange two raised areas 09, in the circumferential direction. In this case, a common regulator device 19, as well as a common reference variable $P_{SOLL}$ can be provided for each raised area 09 of the cylinder 01, 02, 23, 24, and also for all of the raised areas 09 of a cylinder 01, 23. Also, all cylinders 01, 02, 23, 24 can have raised areas 09 and/or interruptions 06.

As explained above, in an advantageous embodiment of the present invention, the distance a09, or the phase relation, between the interruption 06 and the raised area 09 is also configured to be variable.

In one preferred embodiment, this can take place, for example, mechanically wherein an effective shape of the raised area 09, or its absolute position, is changed. In the first case, an axially extending spindle, having the raised area 09, can have an appropriate shape on its exterior surface in such a way that, when turning the spindle by the use of an actuator, which is not specifically represented, another area of the exterior of the spindle becomes effective as the raised area 09. In the second case, fingers, which are, for example, arranged in a comb-like manner on the surface area of the base body of the cylinder 01, 02, can be moved in the circumferential direction of the cylinder by an actuator, which is also not specifically represented.

In another embodiment of the present invention, the two cooperating cylinders 01, 02, 23, 24 are embodied to be variable in their angle of rotation position $\phi$ with respect to each other. In case the interruption 06 and the associated raised area 09 are arranged on different cylinders 01, 02, 23, 24, the change in the relative angle of rotation position $\phi$ causes a change of the distance a09. For example, this can be realized in such a way that the two cylinders 01, 02, 23, 24 are rotatorily driven, mechanically independently of each other, by the use of separate drive motors. In this case, one of the drive motors, which, as a rule, are electronically synchronized, is impressed with an offset in its reference angular position for changing the distance a09. However, the change of the relative angle of rotation position can also be performed by the use of customary mechanical devices, such as are common, for example, for setting the position in the circumferential direction.

The control, or the regulation, of the distance a09 can take place in a manner corresponding to the explanations of the preferred embodiments in accordance with FIGS. 8 to 12. As explained in connection with the height h09, it is then possible to store appropriate interrelationships between the roll-off speed "v" and the distance a09, or to store optimization algorithms for accomplishing a variation of the distance a09 as a function of the relative amplitude e(t), and possibly of the roll-off speed "v."

While preferred embodiments of a method and device for reducing vibrations on rotating parts, and vibration-damped rotating part, in accordance with the present invention have been set forth fully and completely hereinabove, it will be apparent to one of skill in the art that various changes in, for example, the overall sizes of the cylinders, the specific cylinder motors, and the like could be made without departing from the true spirit and scope of the present invention which is accordingly to be limited only by the appended claims.

What is claimed is:

1. A method for reducing vibrations of at least two rotating components rolling off against each other including:
   providing a substantially circular contour of an effective surface area on at least one of said at least two rotating components;

providing at least one raised area projecting from said effective surface area;

providing a value defining one of a status of a printing press utilizing said at least two rotating components and said vibration; and changing one of a height in a radial direction of said at least one raised area, and a relative position in a circumferential direction of said at least one raised area as a function of said value.

2. The method of claim 1 further including providing said value as a function of a roll-off speed.

3. The method of claim 1 further including providing said value as a function of an amplitude of said vibration of at least one of said rotating components.

4. The method of claim 1 further including controlling one of said height and said relative position of said raised area as a function of an amplitude of said vibration detected on at least one of said rotating components.

5. The method of claim 1 further including providing an interruption on said effective surface area of at least one of said components and changing said relative position of said at least one raised area in said circumferential direction with respect to said interruption.

6. The method of claim 1 further including providing a logic unit, storing an interrelationship in said logic unit and using said interrelationship for changing said one of said height and relative position.

7. The method of claim 6 further including providing an actuator for changing said one of said height and relative position and constituting said interrelationship depending on a reference value of an operating point of said actuator from a roll-off speed.

8. The method of claim 1 further including providing an actuator for changing said one of said height and relative position and varying a reference variable for an operating portion of said actuator using a stored interrelationship between a relative amplitude of said at least two rotating components and a manipulated value for operating said actuator.

9. A device for reducing vibrations of at least two rotating components which roll off on each other comprising:

a substantially circular contour of an effective surface area of at least one of said rotating components;

at least one raised area projecting from said effective surface area; and means for providing a value defining one of a status of a printing press utilizing said at least two rotating components and said vibration; and means for changing at least one of a height of said raised area in a radial direction and a relative position of said at least one raised area in a circumferential direction of said at least one rotating component; as a function of a value that defines the printing press status or vibration.

10. The device of claim 9 further including a control device having a logic unit and an interruption on said surface area, said control device defining said one of said height and said position with respect to said interruption as a function of a value defining a state of a printing press utilizing said at least two rotating components.

11. The device of claim 10 further including a circumferential length of said effective surface, said position of said raised area with respect to said interruption having a position length, a ratio of said position length to said circumferential length being between 0.002 and 0.02 of said circumferential length.

12. The device of claim 9 further including a regulating unit with a logic unit and an interruption on said surface area, said regulating unit defining said one of said height and said position with respect to said interruption as a function defining the vibration.

13. The device of claim 9 further including a control system with a logic unit and an interruption on said surface area, said control system defining said one of said height and said relative position with respect to said interruption as a function defining the vibration.

14. The device of claim 9 wherein said at least one raised area is a lip of a base body of one of said at least two rotating components.

15. The device of claim 14 wherein said component has a barrel with an axial direction having a length and wherein said lip extends in said axial direction over said length.

16. The device of claim 14 further including a leg of said lip having a leg length, said substantially circular contour having a circumferential length, a ratio of said leg length to said circumferential length being between 0.02 and 0.04 times said circumferential length.

17. The device of claim 9 further including an actuator adapted to change said height of said raised area, and a remote control for said actuator.

18. The device of claim 17 wherein said actuator is operable by a pressure medium.

19. The device of claim 17 wherein said actuator is a reversibly deformable hollow body and further including a groove extending beneath said raised area, said actuator being located in said groove.

20. The device of claim 9 wherein said raised area is located on only one of said at least two rotating components.

21. The device of claim 9 further including at least one interruption on said effective surface area of one of said at least two rotating components.

22. The device of claim 9 further including at least one interruption on said at least one of said two rotating components also having said at least one raised area.

23. The device of claim 9 further including at least one interruption on said effective surface area of each of said at least two rotating components.

24. The device of claim 9 further including said at least one raised area on said effective surface area of each of said at least two rotating components.

25. The device of claim 9 wherein there are four of said rotating components acting in pairs and further wherein one of said rotating components in each of said pairs includes said at least one raised area.

26. The device of claim 9 wherein said at least one rotating component having said at least one raised area is a transfer cylinder of a printing group of a rotary printing press.

27. The device of claim 9 wherein said at least one rotating component having said at least one raised area is a forme cylinder of a printing group of a rotary printing press.

28. A rotating vibration damped component of at least two rotating components which roll off on each other comprising:

a substantially circular contour of an effective surface area of said rotating component;

a raised area projecting out of said effective surface area;

means for providing a value defining one of a status of a printing press utilizing said at least two rotating components and said vibration; and means for varying at least one of a height of said raised area in a radial direction and a relative position of said raised area in a circumferential direction of said rotating, vibration damped component; as a function of a value that defines the printing press status or vibration.

29. The component of claim 28 further including a control system with a logic unit adapted to control at least one of said height and relative position as a function of a value defining a state of a printing press including said component.

30. The component of claim 28 further including a regulating device with a logic unit adapted to control at least one of said height and relative position as a function of a value defining the vibration of said component.

31. The component of claim 28 wherein said at least one raised area is one of a tongue, a lip, and a bracket in a base body of said component, said base body having said surface area.

32. The component of claim 31 further including a barrel of said base body and having an axial length, said one of said tongue, said lip and said bracket extending over said length of said barrel.

33. The component of claim 31 wherein said one of said tongue, said lip and said bracket has a leg with a leg length and further wherein said component has a circumference with a circumference length, a ratio of said leg length to said circumference length being between 0.02 and 0.04.

34. The component of claim 28 wherein said means for changing said height is a remote controlled actuator.

35. The component of claim 34 wherein said actuator is driveable by a pressure medium.

36. The component of claim 34 wherein said actuator is a deformable hollow body and further including a groove underlying said raised area, said actuator being positioned in said groove.

37. The component of claim 28 further including at least one interruption on said effective surface area of said component.

38. The component of claim 37 further including a distance between said at least one interruption and said raised area, and a circumferential distance of said effective surface area, a ratio between said distance and said circumferential distance being between 0.002 and 0.02.

* * * * *